H. J. BONHAM.
RAIL FITTING.
APPLICATION FILED OCT. 30, 1913.
1,110,183.
Patented Sept. 8, 1914.
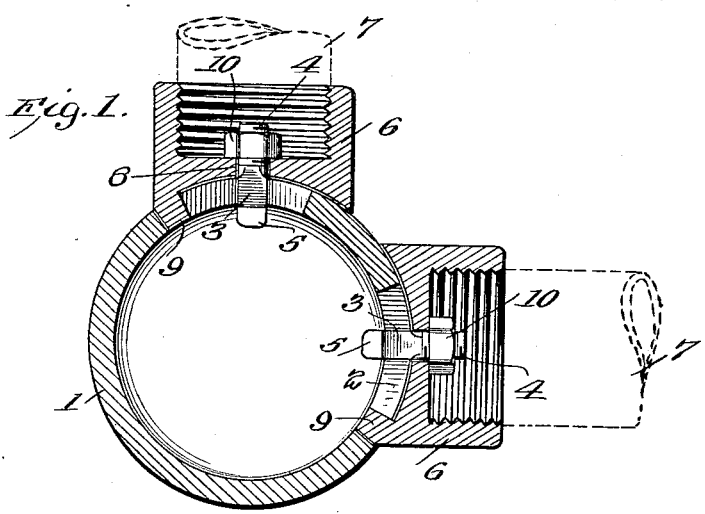
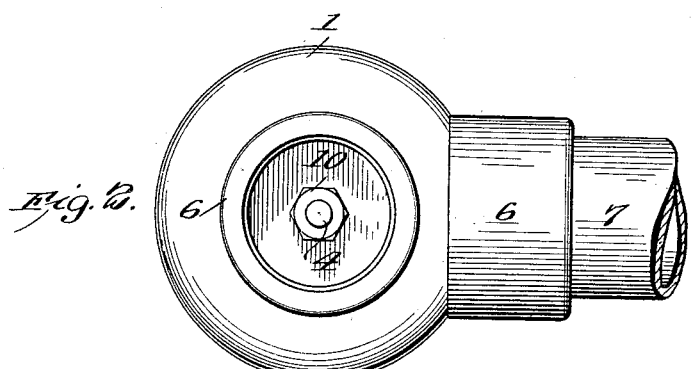
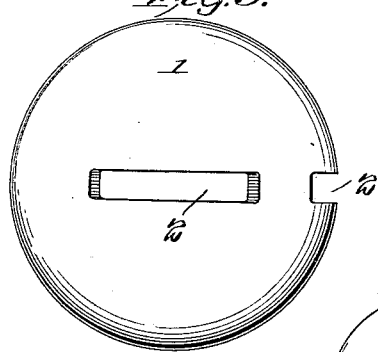
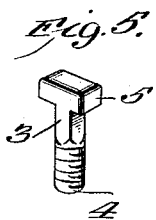
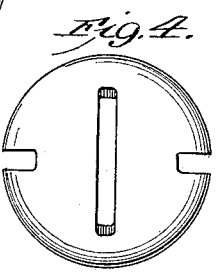
WITNESSES
INVENTOR
HARRY J. BONHAM
BY
ATTORNEYS
THE NORRIS PETERS CO., PHOTO-LITHO., WASHINGTON, D. C.

UNITED STATES PATENT OFFICE.

HARRY J. BONHAM, OF LOS ANGELES, CALIFORNIA.

RAIL-FITTING.

1,110,183.  Specification of Letters Patent.  Patented Sept. 8, 1914.

Application filed October 30, 1913. Serial No. 798,249.

*To all whom it may concern:*

Be it known that I, HARRY J. BONHAM, a citizen of the United States, and a resident of Los Angeles, in the county of Los Angeles, State of California, have invented a new and useful Improvement in Rail-Fittings, of which the following is a specification.

My invention is an improvement in rail fittings, and has for its object the provision of a simple, cheap means for smoothly and firmly connecting rails and pipes, which may be easily applied and removed, and which will firmly hold the rails or pipes in their proper relative position.

In the drawings: Figure 1 is a transverse section of the improvement; Fig. 2 is a plan view; Fig. 3 is a plan view of the connecting device detached; Fig. 4 is a similar view of a modified form; and Fig. 5 is a perspective view of a bolt.

The present embodiment of the invention comprises a hollow spherical member 1 provided at suitable points with slots 2 communicating with the interior of the member. Each of the slots 2 is adapted to receive a bolt comprising a stem 3 threaded at one end at 4 and provided at the other with a head 5 extending on both sides of the stem. The bolt is T-shaped, and the head is designed to be arranged transverse to the slot. The stem 2 is rectangular in cross section and is of a size to fit the slot closely to prevent turning of the bolt. The head is of the same width as the body.

An internally threaded socket 6 is provided for engaging the threaded end of the rail or pipe 7, and each socket is provided on its base with an opening 8 for receiving the bolt. Each socket is also provided with a lug 9 at one side for engaging the slot, and the said lug is bent inwardly at an angle to the axis of the socket. The end faces of the slots are radial to the member 1, and the lugs 9 are bent to fit smoothly against the said end faces. The ends of the sockets are concave and shaped to fit the surface of the member 1, and the said sockets are seated on the member 1 with the lug 9 engaging the adjacent slot at one end.

In assembling the fitting and rails the bolts are first placed. The head of the bolt is turned longitudinally of the slot and passed through the same until the threaded portion 4 is in the slot. The bolt is now turned to bring the head transverse to the slot and the bolt is moved outwardly to engage the polygonal stem with the slot. The socket is now placed with the lug 9 in the slot at one end.

The parts are so proportioned that when the socket is in such position the opening 8 registers with the slot, and the bolt is passed through the said opening and engaged by a nut 10.

The sockets may be arranged to hold the rails at any angle with respect to each other, this arrangement depending upon the arrangement of the slots. The member 1 may have two slots arranged to hold the rails at right angles, or may have more than two slots.

In Fig. 4 the member 11, which is the same as member 1, is provided with three slots 12 for receiving three fittings.

The device is easily assembled and holds the sockets firmly against rotation, in order that the pipes 7 may be turned into the sockets. The sockets are held against rocking movement in any direction, and the fitting forms a smooth joint, all of the connecting mechanism being concealed from view. It will be evident that the member 1 is not necessarily spherical, since it is obvious that a cylindrical member would serve the same purpose and could be used in like manner. The essential feature is the circular cross section of the connecting member and the circumferential slots.

I claim:

1. A device of the character specified, comprising a hollow spherical member provided with a slot, a socket for the slot, the socket having its inner end concave to fit the surface of the said member and having a central opening for registering with the slot, and a lug at one side for engaging the end of the slot, and a bolt passing through the slot and opening, said bolt having a head transverse to the slot, and a polygonal stem fitting the slot to prevent rotation of the bolt, and a nut engaging the outer end of the bolt.

2. A device of the character specified, comprising a spherical connecting member provided with a slot in its wall, a socket for the slot, the socket having its inner end concave to fit the surface of the member and having a central opening, a bolt passing through the slot and the opening, said bolt having a head transverse to the slot, and a stem fitting the slot to prevent rotation of the bolt, and means for preventing rotation of the socket.

3. A device of the character specified, comprising in combination a connector and a member to be connected, the connector having a slot and the member to be connected having a lug for engaging the slot at one end thereof, and a bolt passing through the slot and the member to be connected for clamping the said member to the connector.

HARRY J. BONHAM.

Witnesses:
A. W. JACKSON,
ROBERT H. RAYMOND.